Figure 1:
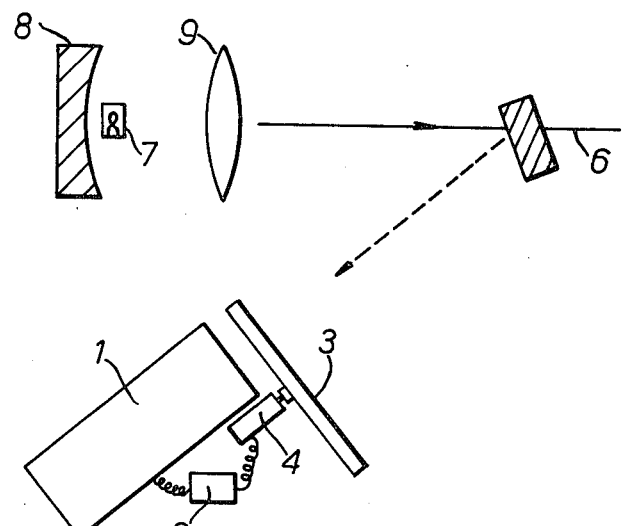

United States Patent [19]
Sarson et al.

[11] 4,125,857
[45] Nov. 14, 1978

[54] FIELD SEQUENTIAL COLOR TELEVISION CAMERA ARRANGEMENTS

[75] Inventors: Alan E. Sarson; William J. R. Clark, both of Great Baddow, England

[73] Assignee: Elliott Brothers (London) Limited, Chelmsford, England

[21] Appl. No.: 785,782

[22] Filed: Apr. 8, 1977

[30] Foreign Application Priority Data

Apr. 8, 1976 [GB] United Kingdom ............... 14210/76

[51] Int. Cl.² ............................................. H04N 9/07
[52] U.S. Cl. ....................................... 358/42; 358/43
[58] Field of Search .............................. 358/42, 43, 44

[56] References Cited

U.S. PATENT DOCUMENTS

| 2,310,337 | 2/1943 | Anderson | 358/42 X |
|---|---|---|---|
| 2,312,792 | 3/1943 | Bamford | 358/42 |
| 3,604,839 | 9/1971 | Kitsopoulos | 358/42 X |

OTHER PUBLICATIONS

McGraw Hill Encyclopedia of Science & Technology, vol. 13, pp. 476, 477.

Primary Examiner—Robert L. Richardson
Attorney, Agent, or Firm—Diller, Ramik & Wight

[57] ABSTRACT

A field sequential television camera is provided in which a disc having a plurality of differently colored segmental filters is rotated in front of an image isocon camera tube. Normally six segmental filters are provided presenting sequentially, red, green and blue in order. The image section of the camera tube is arranged to be gated so that an electron image reaches the target only during a fraction of each sequential color field sufficient to permit operation of the target above the knee of its transfer characteristic.

13 Claims, 3 Drawing Figures

FIELD SEQUENTIAL COLOR TELEVISION CAMERA ARRANGEMENTS

This invention relates to field sequential colour television camera arrangements.

As is well known, it is possible to generate colour television signals utilizing a single camera tube by the expedient of causing a required number of colour filters to be sequentially presented between the face plate of the camera tube and the scene being viewed. Whilst each filter is in front of the face plate, one complete field is scanned which is the reason for the system being known as a field sequential system. Commonly three different filters would be provided, each passive to a different one of the three primary colours red, green and blue.

A serious defect with a field sequential colour television camera is that, in view of the speeds involved, it is necessary for the filters to be mounted on a drum or disc which is continuously rotated. Thus as each filter is scanned the appropiate filter is, in fact, moving past the face plate. The effect of this is that unless the disc or drum system is unduly large, colour contamination from field to field seriously degrades the quality of the colour signal produced. Where the filters are provided on a drum it is known to phase the rotation of the drum so that the shadow of the spacers separating adjacent filters follows the scanning line across the face plate. Whilst this minimises colour contamination from one field to the next, again the drum is unduly large. The size of the drum may be reduced by providing a 45° mirror to bring in the light at right angles to the camera tube axis, but such a measure requires a lens with a considerable back focal distance.

It is believed that it is largely the above difficulties, and of course, the general tendency to avoid mechanically moving components, which led to the rejection of the field sequential television camera for closed-circuit purposes, in favour of the television camera having separate camera tubes for the different colours.

However, the field sequential system still possesses the advantage that it requires but a single camera tube and for many industrial purposes where at present a single output black and white television camera is utilised, the use of a field sequential colour television camera could be used to advantage if it were not for the difficulties referred to above.

One common requirement, for example, is the underwater inspection of structures such as the stanchions of piers and oil rigs of deterioration due to corrosion. At present television cameras for such underwater inspection work tend to be monochrome due to the desirability of providing as small a camera as is practicable. However, there is no doubt but that many types of corrosion, for example, are much more readily detected if the picture presented to an observer is coloured.

The present invention seeks to provide an improved field sequential colour television camera arrangement, which, because it may be provided to be relatively compact, is particularly well suited for use for industrial purposes, such as the underwater inspection of structures liable to deterioration.

According to this invention a field sequential colour television camera arrangement is provided wherein means are provided for sequentially presenting different colour filters between the face plate of a camera tube and a viewed scene and means are provided for preventing the formation of image signals on the target of said camera tube other than during a fraction of each sequential colour field.

Preferably said camera tube is an image isocon and means are provided for gating the image section of said image isocon so that an electron image reaches the target thereof only during a fraction of each colour field.

The fraction of each colour field during which an electron image reaches said target should be such that the illumination of the face plate during the fraction of a field is sufficient to permit operation of said target above the knee of its transfer characteristic.

Preferably said filters are segmental filters mounted in a disc which is arranged to be rotated in front of the face plate of said camera by means of a synchronous motor synchronised with the scanning and aforementioned gating timing of the image section of said camera tube.

Preferably said disc comprises a plurality of filters of the same colour characteristic.

Preferably six individual segmental filters are provided in said disc said six filters comprising, in rotational order, three different primary colour filters followed in the same order, by a further three of said primary colour filters.

Usually means would be provided for relatively strongly illuminating a target at relatively close range. Said last mentioned means preferably comprises a tungsten iodide lamp mounted in front of a reflector and behind a lens.

Particularly for underwater inspection purposes, it is desirable to provide colour balance control in order that colour contrast may be optimised.

Preferably, where colour balance control is provided, means are provided for independently adjusting the gating interval in respect of each colour whereby colour contrast may be adjusted.

Said fraction of a colour field will normally be less than one quarter of a colour field and preferably one tenth or less of a colour field. In one embodiment of the invention said fraction is approximately one twenty-fifth of a colour field.

Figure 2:
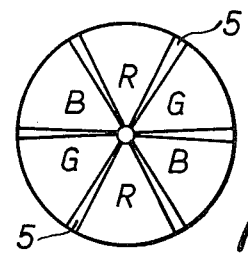
Figure 3:
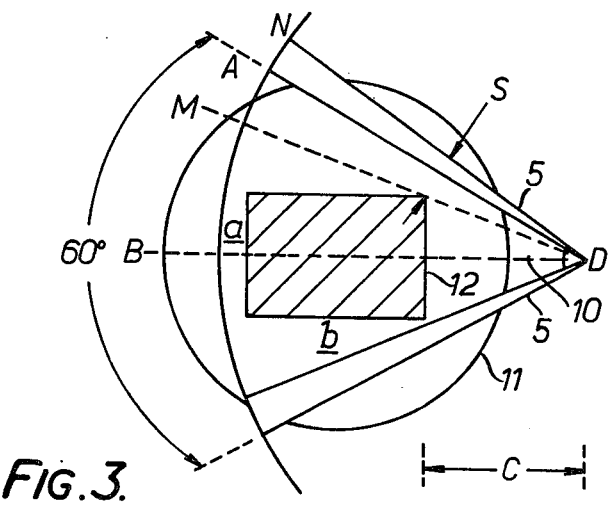

The invention is illustrated in and further described with reference to the accompanying drawing in which, FIG. 1 is a schematic representation of one field sequential colour television camera arrangement in accordance with the present invention, FIG. 2 represents the face of the filter disc used in FIG. 1 and FIG. 3 is an explanatory diagram.

Referring to FIG. 1, 1 represents an image isocon camera tube of known form. Timing signals, power supplies, and the like are represented by the block 2. Mounted in front of the face plate of the image isocon 1 is a filter disc 3 which is rotated by means of a synchronous motor 4.

As best seen from FIG. 2, the filter disc 3 consists of six individual segmental filters separated by supporting radially extending ribs 5. Two of the segmental filters B are blue filters, two of the segmental filters R are red filters and two of the segmental filters G are green filters.

Synchronous motor 4 is synchronised to the scanning of the target of the image isocon so that the time during which one of the filters B, R or G is passing across the face plate corresponds to one field period. However, instead of permitting an optical image to form on the target of the image isocon during a complete colour field period, the image section of the image isocon is arranged synchronously to be gated on during only a fraction of each field period. The size of the last-mentioned fraction of a field period is such that the illumination of the face plate during the fraction is sufficient to permit the storage target of the image isocon to operate above the knee of its transfer characteristic.

In order to increase the illumination of said face plate means are provided for relatively strongly illuminating an object 6 which is required to be inspected by the camera arrangement. The illuminating means consists of a tungsten iodide lamp 7 mounted in front of a reflector 8 and behind a lens 9. By increasing the illumination the fraction of each field period during which the image section of the image isocon 1 need be gated on can be reduced. In practice, it is found that the fraction of each field period during which the image section of the image isocon needs be gated on can readily be made sufficiently small for serious degradation due to colour contamination to be avoided without requiring an unduly large disc such as has previously been required to achieve a similar effect.

The gating interval during which the image section of the image isocon is gated on is provided to be individually adjustable for the different colours so as to permit independent adjustment for colour balance control. These individual adjustments may be utilised in order to optimise the colour contrast in dependence upon the nature of the object 6, which it is required to inspect.

In one practical example of a field sequential colour television camera arrangement as schematically represented in FIGS. 1 and 2, the illuminating lamp 7 is a tungsten iodide lamp of 1,000 watts, whilst the reflector is such as to increase on-axis flux to provide a luminance of approximately 22,000 lumens distributed approximately uniformly over $4\pi$ steradians. The lens 9 is of focal length 5 cm.

The dimensioning of the filter disc and the determination of the nominal gating period during which the image section of the image isocon is gated on in the aforementioned practical embodiment will now be described with reference to FIG. 3 in which one of the segmental filters R, G or B is represented at 10, the radially extending ribs are again represented at 5, the outline of the face plate of the image isocon 1 is represented at 11 and the active area of the photo-cathode of image isocon is represented by the rectangle 12.

Each segmental filter is nominally 60° as represented. Each radial rib 5 is denoted by NDA and a radial line touching the top right hand (as viewed) corner of the rectangle 12 is denoted by MD. A radial line extending through the centre of the segmental filter is denoted by BD. Angle MDN = $2\theta$ degrees and angle MDB = $\phi$ degrees.

The rectangle 12 is of shorter side $a$ and longer side $b$.

The width of the radial rib 5 adjacent the top right hand corner of the rectangle 5 is S/2, in other words angle NDA = ADM.

For a type P8040 image isocon as used in the practical case being considered dimension $a$ may be taken to be 23 mm. and $b$ may be taken to be 30.5 mm.

One colour field has a duration of 1/100 second and the rotation rate of the disc = 1,000 r.p.m. (1 revolution in 0.06 seconds).

Then $\theta = [30 - \text{arc tan}(a/2c)]$ degrees = 2.4° where $c$ is the radial distance of the rectangle 12 along the line DB from the centre of the disc 3.

$$S = (c^2 + \frac{a^2}{4})^{\frac{1}{2}} \times 2\theta = 2.08 \text{ mm.}$$

Therefore the width of the radial rib adjacent the top right hand corner of the rectangle 12 = 1.04 mm.

The time taken to rotate through $\theta° = \frac{2.4}{360} \times 0.06$ $$= 4 \times 10^{-4} \text{ seconds}$$

The field period = 0.01 seconds.

The time available for the image section of the image isocon to be gated on (i.e. the time during which the active portion of the photo-cathode, represented by rectangle 12, is covered completely by a filter) is then equal to or less than 0.4 milliseconds which is 0.4/10 = 4% of the field period.

The effective loss of storage time = 96% of the field period.

On this basis, the filter disc 3 is provided to have a diameter D = $2(c + b + x)$ where $x$ is the width of the edge of the disc around the segmental filters. Typically $x = (c+b/10)$. In this case D = 11.55 cm.

We claim:

1. A field sequential colour television camera arrangement wherein means are provided for sequentially presenting different colour filters between the face plate of a camera tube and a viewed scene and means are provided for preventing the formation of image signals on the target of said camera tube other than during a fraction of each sequential colour field.

2. An arrangement as claimed in claim 1 and wherein said camera tube is an image isocon and means are provided for gating the image section of said image isocon so that an electron image reaches the target thereof only during a fraction of each colour field.

3. An arrangement as claimed in claim 1 and wherein said filters are segmental filters mounted in a disc which is arranged to be rotated in front of the face plate of said camera by means of a synchronous motor synchronised with the scanning and aforementioned gating timing of the image section of said camera tube.

4. An arrangement as claimed in claim 3 and wherein said disc comprises a plurality of filters of the same colour characteristic.

5. An arrangement as claimed in claim 4 and wherein six individual segmental filters are provided in said disc and six filters comprising, in rotational order, three different primary colour filters followed in the same order, by a further three of said primary colour filters.

6. An arrangement as claimed in claim 1 and wherein means are provided for relatively strongly illuminating a target at relatively close range.

7. An arrangement as claimed in claim 6 and wherein said last mentioned means comprises a tungsten iodide lamp mounted in front of a reflector and behind a lens.

8. An arrangement as claimed in claim 1 and wherein colour balance control is provided.

9. An arrangement as claimed in claim 8 and wherein means are provided for independently adjusting the gating interval in respect of each colour whereby colour contrast may be adjusted.

10. An arrangement as claimed in claim 1 and wherein fraction of a colour field is less than one quarter of a colour field.

11. An arrangement as claimed in claim 10 and wherein fraction of a colour field is one tenth or less of a colour field.

12. An arrangement as claimed in claim 11 and wherein fraction of a colour field is approximately one twenty-fifth of a colour field.

13. A field sequential color television camera arrangement comprising, in combination:

an image isocon camera tube having a face plate and a photo-cathode having an active area of predetermined size;

means sequentially interposing different color filters between said face plate and a viewed scene whereby periodically and for time periods each of which is a fraction only of a field period of the tube, a different sequential one of said color filters is located relative to said active area of the photo-cathode as to image said scene thereon solely through such filter; and means for gating said tube to store images only during said time periods.

* * * * *